United States Patent
Ohguri

(10) Patent No.: US 9,413,995 B2
(45) Date of Patent: Aug. 9, 2016

(54) RADIOGRAPHIC APPARATUS AND METHOD FOR CONTROLLING RADIOGRAPHIC APPARATUS

(71) Applicant: CANON KABUSHIKI KAISHA, Tokyo (JP)

(72) Inventor: Hirokazu Ohguri, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/198,784

(22) Filed: Mar. 6, 2014

(65) Prior Publication Data
US 2014/0252243 A1 Sep. 11, 2014

(30) Foreign Application Priority Data
Mar. 6, 2013 (JP) ................. 2013-044595

(51) Int. Cl.
G01T 1/00 (2006.01)
H04N 5/361 (2011.01)
H04N 5/32 (2006.01)
H04N 5/217 (2011.01)

(52) U.S. Cl.
CPC ............ H04N 5/361 (2013.01); H04N 5/217 (2013.01); H04N 5/2176 (2013.01); H04N 5/32 (2013.01)

(58) Field of Classification Search
CPC ............ G01T 1/17; H04N 5/32; H04N 5/361
See application file for complete search history.

(56) References Cited

U.S. PATENT DOCUMENTS

2013/0032696 A1* 2/2013 Tajima .................. 250/208.1

FOREIGN PATENT DOCUMENTS

| JP | 2011-247605 A | 12/2011 |
| JP | 2012-152477 A | 8/2012 |
| JP | 2013-094183 A | 5/2013 |

* cited by examiner

*Primary Examiner* — David Porta
*Assistant Examiner* — Edwin Gunberg
(74) *Attorney, Agent, or Firm* — Canon USA Inc., IP Division

(57) ABSTRACT

Upon detecting irradiation of X-rays, an X-ray imaging apparatus stops driving scanning lines and makes a transition into an electric charge accumulating state. The X-ray imaging apparatus transmits, to an image processing apparatus, a digital value of a current that flows through a bias line at a timing at which the electric charge accumulating state starts and a scanning line number for identifying a scanning line on which the scan has stopped as defect correction information.

20 Claims, 17 Drawing Sheets

RADIOGRAPHIC APPARATUS AND METHOD FOR CONTROLLING RADIOGRAPHIC APPARATUS

BACKGROUND OF THE INVENTION

1. Field of the Invention

The present invention relates to radiographic apparatuses and methods for controlling radiographic apparatuses. In particular, the present invention is suitably used to obtain an intensity distribution of radiation that has passed through an object in the form of a radiographic image.

2. Description of the Related Art

In an existing technique, an object is irradiated with X-rays from an X-ray irradiation source (X-ray generation apparatus), and an X-ray image, which represents an intensity distribution of the X-rays that have been transmitted through the object, is digitized. The digitized X-ray image is then subjected to necessary image processing to thus obtain a clearer X-ray image. In a digital X-ray imaging apparatus and an X-ray imaging system that generate such X-ray images, the X-ray imaging apparatus communicates with the X-ray generation apparatus in synchronization with each other. The X-ray imaging apparatus transmits obtained X-ray image data to an image processing apparatus such as a personal computer to have image processing be carried out on the X-ray image data or to have the X-ray image data be stored in the image processing apparatus. The image processing apparatus causes the X-ray image data that has been subjected to the image processing to be displayed in a display device such as a display.

Typically, the X-ray imaging apparatus is connected with the image processing apparatus and the X-ray generation apparatus by using a general purpose unshielded twist pair (UTP) cable or the like through respective interfaces necessary for the stated apparatuses to be interconnected. In addition, for the purpose of enhancing ease of installation, facilitating handling, and increasing flexibility in capturing images, the aforementioned apparatuses are connected, in an increasing number of instances, through wireless interfaces such as a wireless LAN with IEEE 802.11 being a representative example.

An X-ray imaging apparatus and an X-ray imaging system that can be installed and handled more easily are being implemented. In such X-ray imaging apparatus and X-ray imaging system, the X-ray imaging apparatus itself can detect the start of irradiation with X-rays from the X-ray generation apparatus, making it unnecessary to connect the X-ray imaging apparatus with the X-ray generation apparatus.

There is a method in which the X-ray imaging apparatus successively selects scanning lines in the X-ray imaging apparatus and stands by while switching between an on state and an off state of a two-dimensional sensor. The X-ray imaging apparatus then detects the start of X-ray irradiation by detecting a change in a current that flows inside the X-ray imaging apparatus. According to this method, part of an electric charge produced through X-ray irradiation may flow out in a pixel that corresponds to a scanning line on which the scan has stopped in response to detecting the start of the X-ray irradiation, and as a result, a linear defect may be produced in a resulting X-ray image. As a countermeasure against such a defect, disclosed is a technique in which the image processing apparatus corrects such a linear defect produced in an X-ray image by using a value of a current that flows inside the X-ray imaging apparatus.

However, for example, in a case in which X-rays emitted from the X-ray generation apparatus are weak or in a case in which large part of the X-rays that have reached the X-ray imaging apparatus has been attenuated by the object and so on, a signal to noise ratio (S/N ratio) of the value of the current that flows inside the X-ray imaging apparatus may be low. In such a case, the value of the current that flows inside the X-ray imaging apparatus may need to be subjected to preprocessing in order to use that value for correcting the defect, and thus processing time therefor may become necessary. In addition, the time it takes to transmit the value of the current that flows inside the X-ray imaging apparatus to the image processing apparatus or the time it takes to carry out correction processing on the X-ray image by using the value of the current that flows inside the X-ray imaging apparatus may also become necessary. Meanwhile, in the X-ray imaging system, there is a high demand for a captured image to be displayed as quickly as possible in order to check the result after irradiating an object with X-rays to capture an image, and the above configuration goes against such a demand.

SUMMARY OF THE INVENTION

A radiographic apparatus according to an exemplary embodiment of the present invention includes a plurality of two-dimensional sensors arranged in a two-dimensional matrix; a detection unit configured to detect that the radiographic apparatus has been irradiated with radiation on the basis of a current that flows inside the radiographic apparatus and that changes in value in response to the radiographic apparatus being irradiated with the radiation; a scanning unit configured to select one row or a plurality of rows of the two-dimensional sensors, to provide a signal to a scanning line connected to the selected two-dimensional sensors so as to turn on the selected two-dimensional sensors for a predetermined period of time to carry out a scan, and to stop the scan in response to the detection unit detecting that the radiographic apparatus has been irradiated with the radiation; a radiographic image generation unit configured to turn off all of the two-dimensional sensors in response to the detection unit detecting that the radiographic apparatus has been irradiated with the radiation so as to accumulate an electric charge in the two-dimensional sensors, and then to turn on the two-dimensional sensors so as to read out the electric charge to generate a radiographic image; and a transmission unit configured to transmit defect correction information to be used to correct a defect in the radiographic image and the radiographic image, and the defect correction information is obtained on the basis of a position at which the scan has stopped and a change in the current obtained when the detection unit has detected that the radiographic apparatus has been irradiated with the radiation. In the radiographic apparatus, the transmission unit starts transmission of the defect correction information prior to starting transmission of the radiographic image.

Further features of the present invention will become apparent from the following description of exemplary embodiments with reference to the attached drawings.

DESCRIPTION OF THE EMBODIMENTS

Hereinafter, exemplary embodiments for embodying the present invention will be described in detail with reference to the drawings.

First Exemplary Embodiment

First, a first exemplary embodiment will be described.

Figure 1:
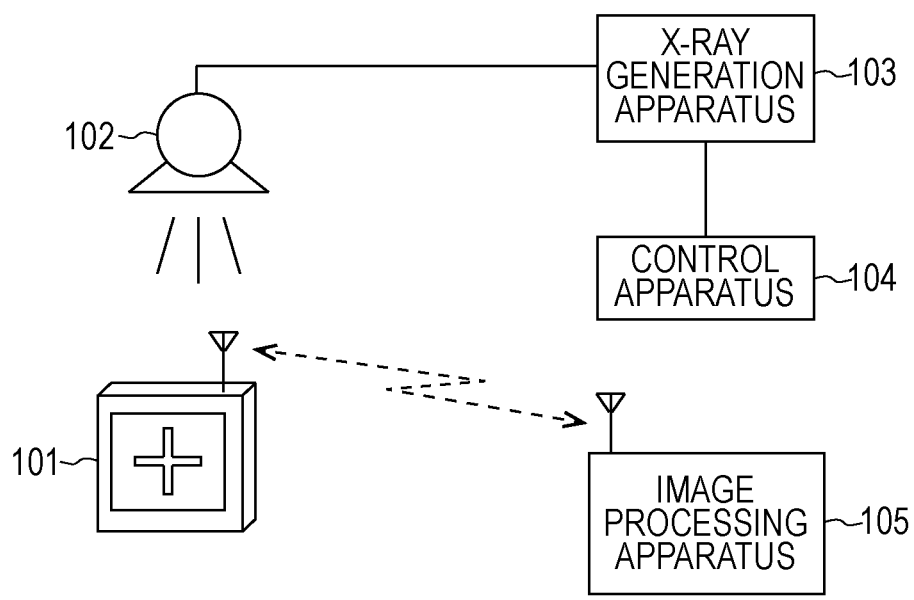
FIG. 1 illustrates a configuration of an X-ray imaging system.
Figure 13:
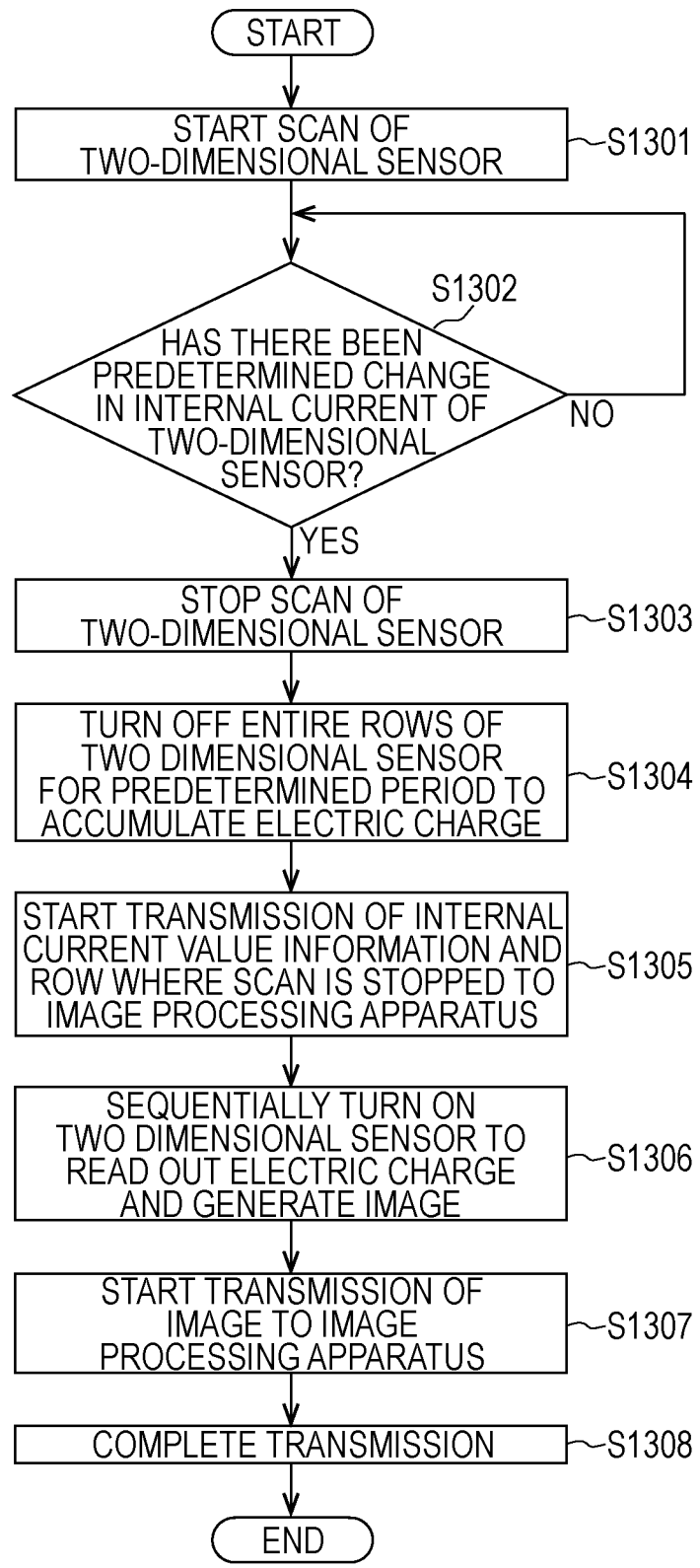
FIG. 13 is a flowchart for describing an operation of the X-ray imaging system.

FIG. 1 illustrates an exemplary configuration of an X-ray imaging system (radiographic system). FIG. 13 is a flowchart for describing an exemplary operation of the X-ray imaging system (radiographic system).

The X-ray imaging system of the first exemplary embodiment includes an X-ray imaging apparatus (radiographic apparatus) 101, an X-ray tube 102, an X-ray generation apparatus 103, a control apparatus 104, and an image processing apparatus 105.

The X-ray imaging apparatus 101 of the first exemplary embodiment includes a built-in wireless transmitter-receiver and can thus communicate wirelessly with an external apparatus. The X-ray tube 102 is disposed so as to oppose the X-ray imaging apparatus 101. The control apparatus 104 controls the X-ray generation apparatus 103. The image processing apparatus 105 includes a built-in wireless transmitter-receiver and can thus communicate wirelessly with an external apparatus.

Figure 2:
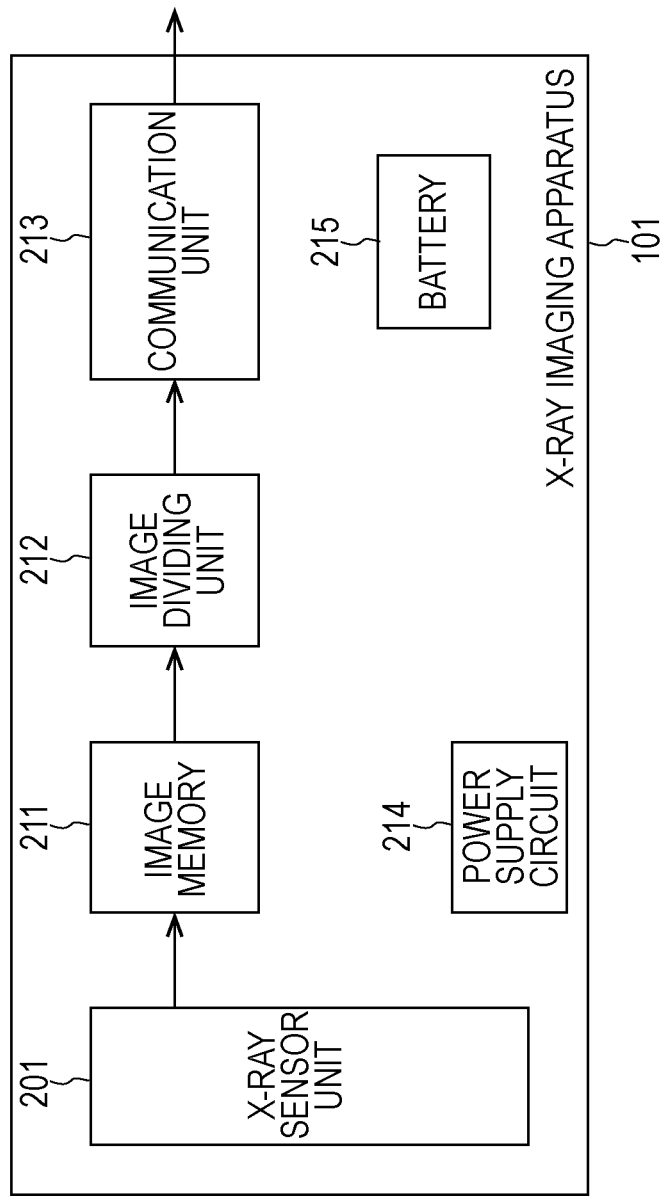
FIG. 2 illustrates a first exemplary configuration of an X-ray imaging apparatus.

FIG. 2 illustrates an exemplary configuration of the X-ray imaging apparatus 101.

Referring to FIG. 2, the X-ray imaging apparatus 101 includes, in its interior, an X-ray sensor unit 201, an image memory 211, an image dividing unit 212, a communication unit 213, a power supply circuit 214, a battery 215 for the X-ray imaging apparatus 10 to operate wirelessly, and so on. The X-ray sensor unit 201, which is an example of a radiation image sensor, outputs image data, and the image data is temporarily stored in the image memory 211. The image dividing unit 212 reads out the image data from the image memory 211 and subjects the image data to dividing processing through a method described later. The communication unit 213 includes a communication circuit, a wireless communication interface, a wired communication interface, and a switching circuit for the stated interfaces. The communication unit 213 further includes a cable connection unit for wired communication. The communication unit 213 transmits image segments divided by the image dividing unit 212 to the image processing apparatus 105. Here, the image dividing unit 212 may be disposed upstream from the image memory 211.

Figure 3:
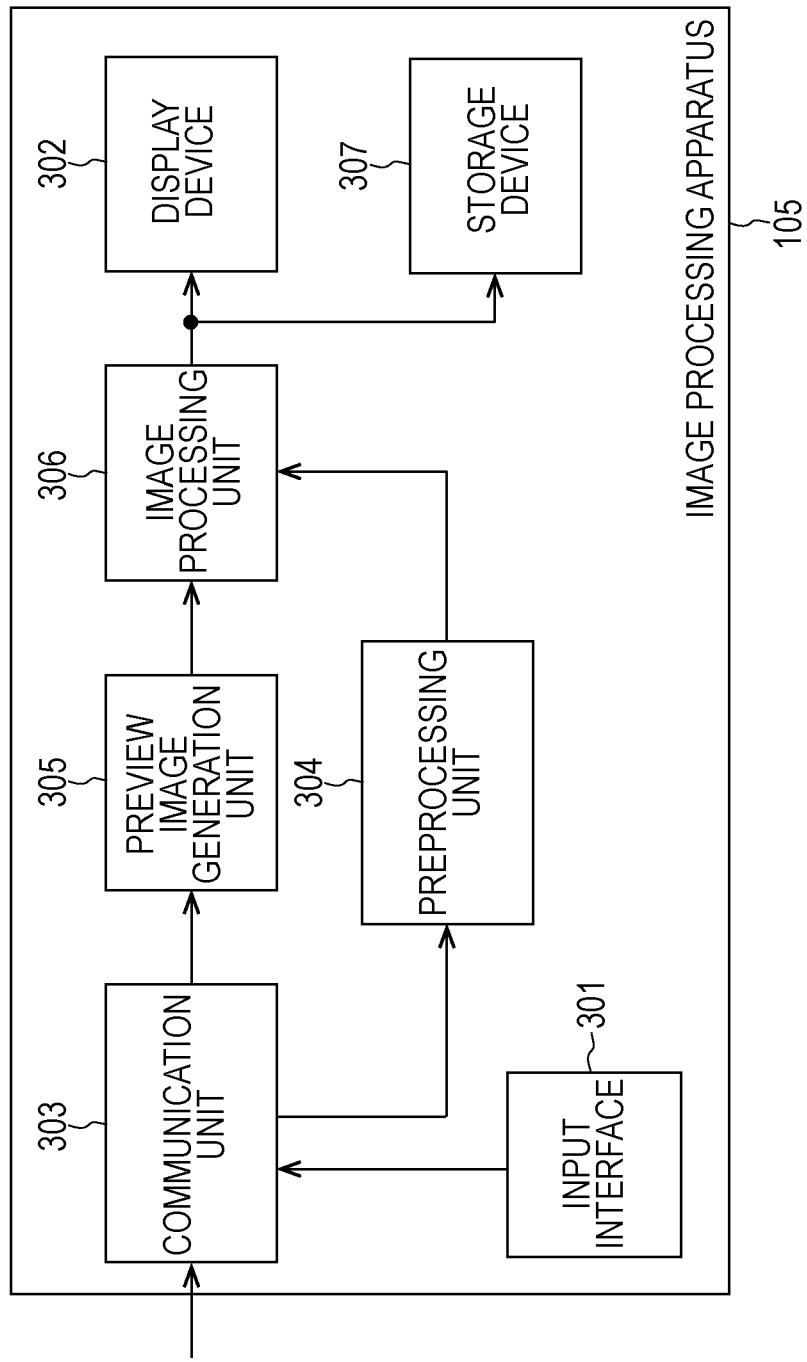
FIG. 3 illustrates a configuration of an image processing apparatus.

FIG. 3 illustrates an exemplary configuration of the image processing apparatus 105.

Typically, a personal computer or the like is used as the image processing apparatus 105. The image processing apparatus 105 provides an operation instruction to the X-ray imaging apparatus 101 or obtains the status of the X-ray imaging apparatus 101 through an input interface 301, a console in a display device 302, and so on. In addition, the image processing apparatus 105 includes a communication unit 303, a preprocessing unit 304, a preview image generation unit 305, an image processing unit 306, a storage device 307, and so on, and carries out image processing, storage of images, image display, and so on. The X-ray imaging apparatus 101 and the image processing apparatus 105 exchange information and data through the wireless communication interfaces or the wired communication interfaces of the communication units 212 and 303.

Upon receiving an instruction from the image processing apparatus 105, the X-ray imaging apparatus 101 carries out a preparation operation of the power supply circuit 214 or the like and then makes a transition into a state of detecting irradiation of X-rays from the X-ray tube 102. In the following description, the "state of detecting irradiation of the X-rays from the X-ray tube 102" is referred as to an "X-ray irradiation detecting state," as necessary.

Thereafter, a user operates the control apparatus 104 to set a desired irradiation condition and so on and then presses a switch (not illustrated) to thus provide an X-ray irradiation instruction to the X-ray generation apparatus 103. On the basis of this irradiation instruction, the X-ray generation apparatus 103 causes the X-ray tube 102 to radiate X-rays. Upon the X-ray imaging apparatus 101 detecting irradiation of the X-rays from the X-ray tube 102 on the basis of a change in a value of a current that flows inside the X-ray imaging apparatus 101, the X-ray imaging apparatus 101 makes a transition from the X-ray irradiation detecting state to an electric charge accumulating state. When a predetermined time has elapsed after the X-ray imaging apparatus 101 has made a transition into the electric charge accumulating state, the X-ray imaging apparatus 101 reads out the electric charge accumulated in a two-dimensional sensor and generates an X-ray image. The X-ray imaging apparatus 101, prior to transmitting the X-ray image, transmits information to be used to correct a defect produced in the X-ray image to the image processing apparatus 105. In the following description, "information to be used to correct a defect produced in an X-ray image" is referred to as "defect correction information," as necessary. The image processing apparatus 105 carries out preprocessing on the defect correction information and then carries out processing of correcting a defect in the X-ray image (image correction).

Figure 4:
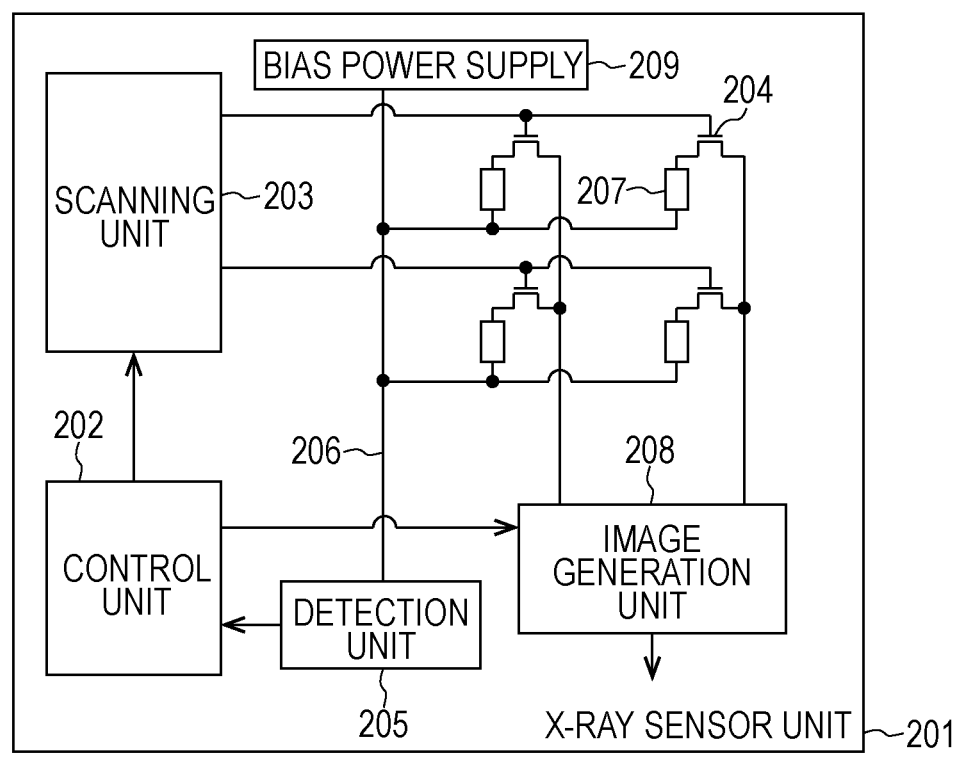
FIG. 4 illustrates a configuration of an X-ray sensor unit.

FIG. 4 schematically illustrates an exemplary configuration of the X-ray sensor unit 201 included in the X-ray imaging apparatus 101. FIG. 4 illustrates, for convenience of simplicity, an X-ray sensor unit in which a plurality of pixels (two-dimensional sensors) are arranged in a two-dimensional matrix of two rows by two columns. In reality, however, an X-ray sensor unit in which pixels are arranged in a several thousand rows by a several thousand columns is used. The number of rows of pixels, the number of columns of pixels, and the number of pixels are not limited to the above.

Figure 5:
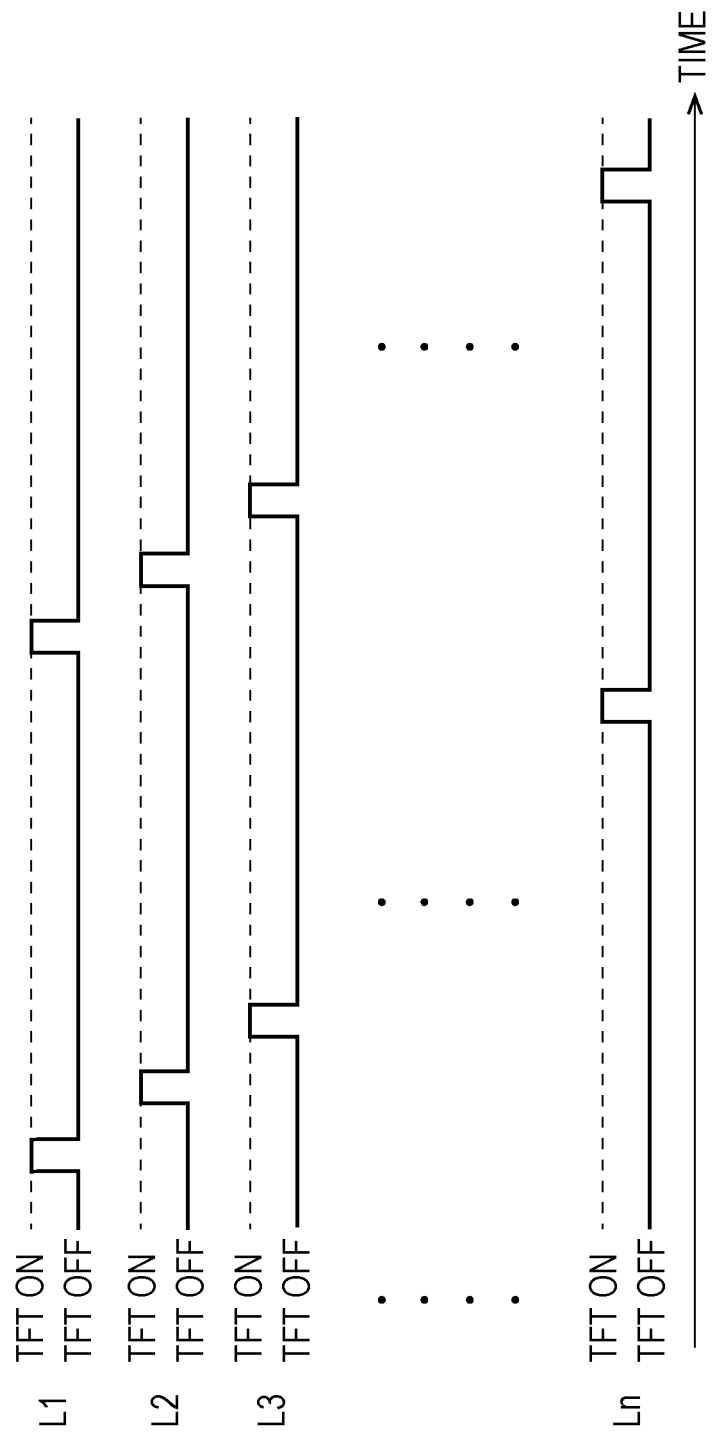
FIG. 5 illustrates a first exemplary scanning sequence of the X-ray sensor unit.
Figure 6:
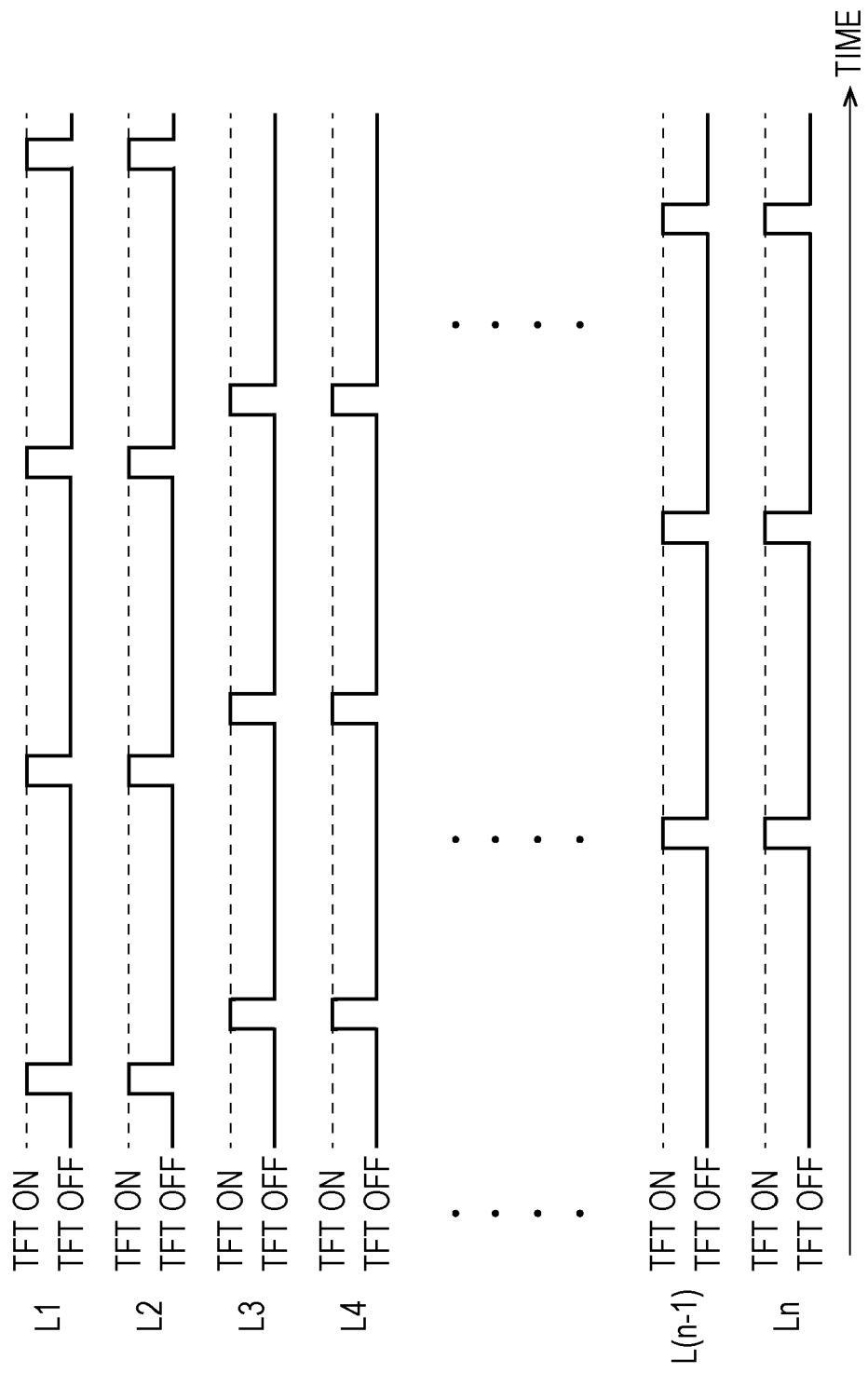
FIG. 6 illustrates a second exemplary scanning sequence of the X-ray sensor unit.
Figure 7:
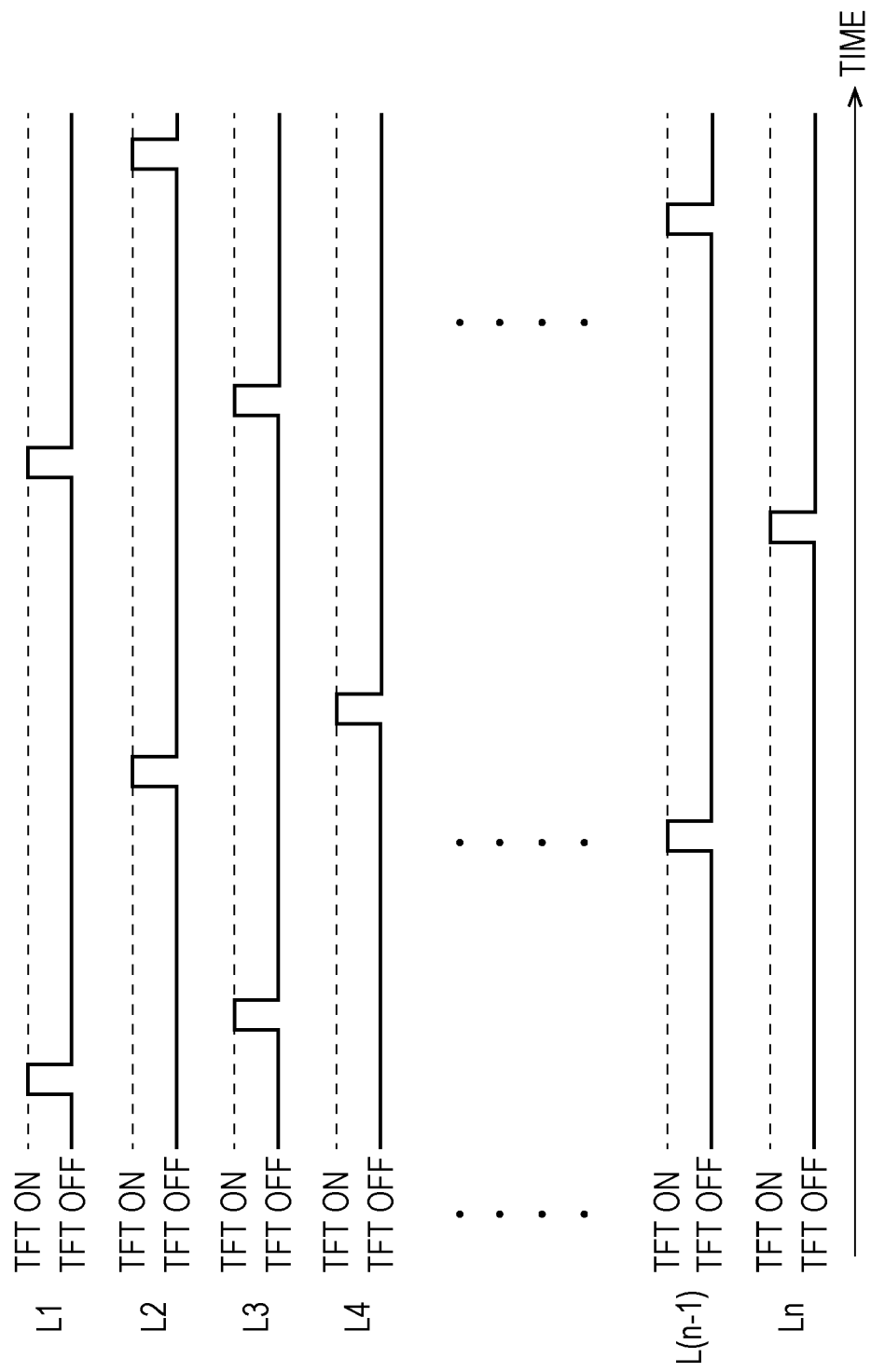
FIG. 7 illustrates a third exemplary scanning sequence of the X-ray sensor unit.

Upon the X-ray imaging apparatus 101 receiving an operation instruction from the image processing apparatus 105, a control unit 202 drives a scanning unit 203 to carry out a scan in which a single row or a plurality of rows of TFTs 204 are turn on at a time for a predetermined period. In other words, the scan of the two-dimensional sensors starts (step S1301 of FIG. 13). As the scanning unit 203 provides a pulse signal to a given TFT 204, the given TFT 204 is turned on for a predetermined period. The order in which the TFTs 204 are scanned or the number of rows in which the TFTs 204 are turned on simultaneously does not matter. FIGS. 5, 6, and 7 each illustrate an exemplary scanning sequence of an X-ray sensor unit that includes n rows of scanning lines, namely from L1 to Ln. As illustrated in FIG. 5, the scanning lines may be scanned sequentially, row by row, starting from an upper end row of the X-ray sensor unit 201, or as illustrated in FIG. 6, a plurality of rows may be selected at once and scanned. Alternatively, as illustrated in FIG. 7, instead of being scanned sequentially, the scanning lines may be scanned row by row with a predetermined number of rows being skipped at a time. As another alternative, the scanning lines may be scanned through a method in which the methods illustrated in FIGS. 6 and 7 are combined (i.e., a plurality of rows may be scanned at once with a predetermined number of rows being skipped at a time).

Figure 8:
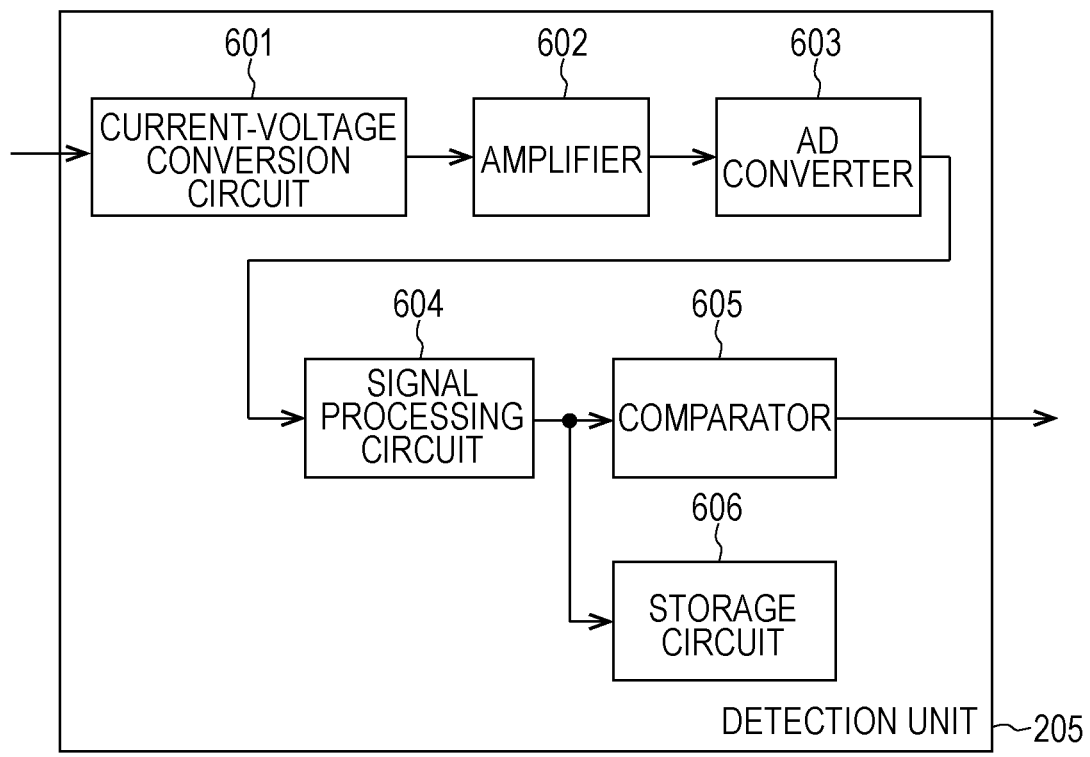
FIG. 8 illustrates a configuration of a detection unit.

The X-ray imaging apparatus 101 continues the scan until the X-ray imaging apparatus 101 detects irradiation of X-rays. In a case in which the X-ray imaging apparatus 101 has driven all of the scanning lines, the X-ray imaging apparatus 101 drives the scanning lines again starting from a scanning line that has been scanned first. FIG. 8 illustrates an exemplary configuration of a detection unit 205.

The detection unit 205 includes a detection circuit, and while the scanning lines are being driven, the detection unit 205 converts a current that flows through a bias line 206 connected to a bias power supply 209 into a digital value through a current-voltage conversion circuit 601, an amplifier 602, an AD converter 603, and a signal processing circuit 604. A comparator 605 then compares (monitors) the digital value with a predetermined threshold and outputs a signal indicating the result of the comparison to the control unit 202 or the like as an X-ray irradiation detection signal. Here, if the digital value is greater than the predetermined threshold, the control unit 202 can determine that there has been a predetermined change in the current (internal current of the two-dimensional sensors) that flows through the bias line 206 and that irradiation of X-rays has been detected (step S1302 of FIG. 13). In addition, the detection unit 205 stores the digital value, one after another, in a storage circuit 606. A state in which the operations described above are being carried out corresponds to the X-ray irradiation detecting state. The bias power supply 209 supplies bias voltages to photoelectric conversion elements 207.

The sampling frequency of the AD converter 603 can be set as desired. Although the AD converter 603 may sample a plurality of times while TFTs 204 on a given scanning line are being turned on, it is desirable, in terms of data processing, to obtain a single digital value for a single row by calculating an arithmetic mean or the like in the end. In addition, it is desirable to carry out correlated double sampling in which, while a given scanning line is being selected, digital values are obtained in a state in which the TFTs 204 are turned on and in a state in which the TFTs 204 are turned off, and a difference between the two digital values is calculated. Such a configuration can enhance tolerance for extrinsic noise. The afore-mentioned digital value is updated successively along with the scans. Thus, the storage circuit 606 overwrites the digital value successively to update the digital value, and it is desirable that the storage circuit 606 have a capacitance that allows at least a single digital value to be held for the entire scanning lines. In this manner, information can be obtained on the digital values at timings at least before and after the irradiation of the radiation is detected.

When X-rays are radiated from the X-ray tube 102, electric charges are generated in the photoelectric conversion elements 207 as respective scintillator layers (not illustrated) emit light, and the electric charges flow through the bias line 206. Through this, the current that flows through the bias line 206 changes. The detection unit 205 detects this change in the current through the aforementioned circuit (i.e., the current-voltage conversion circuit 601, the amplifier 602, the AD converter 603, and the signal processing circuit 604) and outputs an instruction to the control unit 202 for stopping the above-described scan (step S1303 of FIG. 13). Through this, the X-ray sensor unit 201 turns off the TFTs 204 on the entire rows of the scanning lines for a predetermined period of time (step S1304 of FIG. 13). Through this, the X-ray imaging apparatus 101 makes a transition into the electric charge accumulating state in response to detecting the irradiation of the X-rays. When the scan is stopped, the storage circuit 606 stops updating the digital value and retains the digital value at that point, and the control unit 202 stores, in a register (not illustrated), a scanning line number (scanning line positional information) that allows a scanning line on which the scan has stopped to be identified. Here, as long as the position at which the scan has stopped can be identified, it is not necessary to use the scanning line number.

In the first exemplary embodiment, an example in which the current that flows through the bias line 206 is used to detect the irradiation of the X-rays has been described. However, as long as a current that flows inside the X-ray imaging apparatus 101 and that changes in value in response to the irradiation of X-rays, the current that flows through the bias line 206 does not necessarily need to be used.

Figure 9:
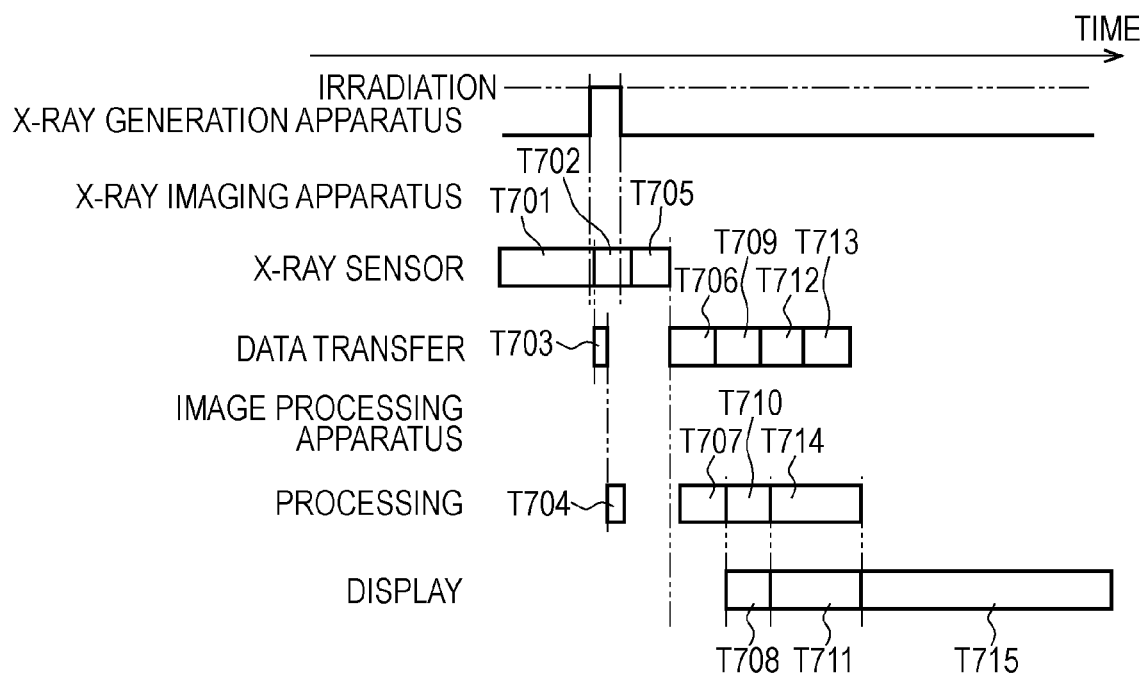
FIG. 9 is a timing chart illustrating a first exemplary operation of the X-ray imaging system.

FIG. 9 is a timing chart illustrating exemplary operations of the X-ray generation apparatus 103, the X-ray imaging apparatus 101, and the image processing apparatus 105 carried out when an X-ray image is captured.

Upon receiving an instruction from the image processing apparatus 105, the X-ray imaging apparatus 101 drives (scans) the scanning lines as described above and waits for the irradiation of the X-rays (period T701). When the X-ray tube 102 radiates the X-rays in response to an instruction from the X-ray generation apparatus 103, the X-ray imaging apparatus 101 detects the irradiation of the X-rays and, on the basis of this detection, successively stops the driving of the scanning lines to turn off the TFTs 204. When the TFTs 204 on the entire scanning lines are turned off, the X-ray imaging apparatus 101 goes into the electric charge accumulating state (period T702). At this timing at which the electric charge accumulating state starts, the X-ray imaging apparatus 101 reads out the digital value (internal current value information) from the storage circuit 606 and also reads out the scanning line number for identifying the scanning line on which the scan has stopped (scan-stopped row) from the register of the control unit 202. The X-ray imaging apparatus 101 then transmits the read-out digital value and scanning line number to the image processing apparatus 105 (period T703, step S1305 of FIG. 13). The image processing apparatus 105 then carries out signal processing on the digital value (period T704).

Figure 10:
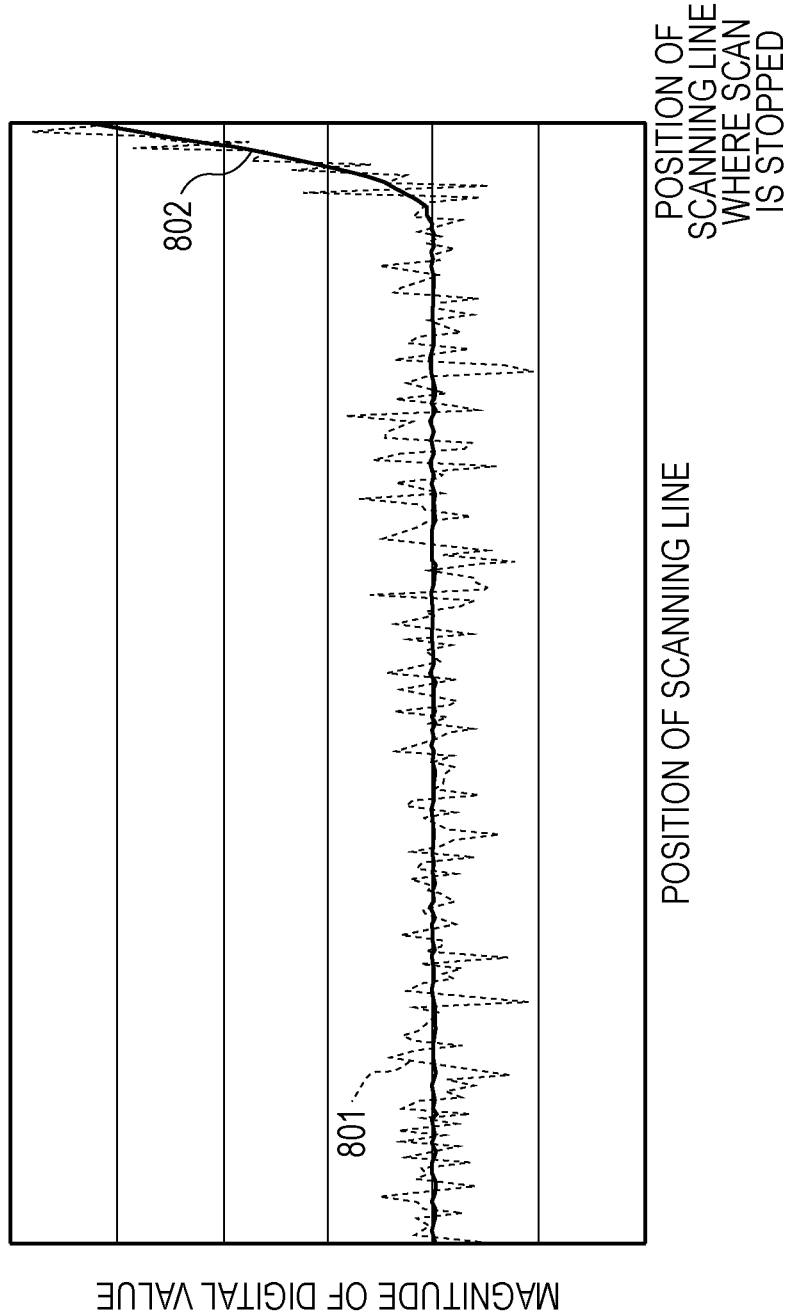
FIG. 10 illustrates an original digital value and a digital value obtained after signal processing.

FIG. 10 illustrates examples of an original digital value and a digital value obtained after the signal processing. The vertical axis represents the magnitude of the digital values, and the horizontal axis represents the position of the scanning line. Indicated at the right end on the horizontal axis in FIG. 10 is a digital value at a scanning line on which the scan has stopped in response to the irradiation of the X-rays being detected. A graph 801, which is indicated by a broken line in FIG. 10, indicates an original digital value, and a graph 802, which is indicated by a solid line, indicates a digital value obtained after the signal processing. The signal processing is carried out in order to facilitate correction of the X-ray image. Specifically, the signal processing is processing of removing a noise component in the original digital value, and such processing is implemented by using a low-pass filter or the like.

When a predetermined time has elapsed, the X-ray imaging apparatus 101 terminates the electric charge accumulating state (period T702) and causes the scanning unit 203 and an image generation unit 208 to operate. Thus, the X-ray imaging apparatus 101 successively turns on the TFTs 204 so as to read out an electric charge. The electric charge is then subjected to voltage conversion by the current-voltage conversion circuit 601 and is amplified by the amplifier 602, and the result is then converted to a digital value by the AD converter 603, resulting in each pixel value. In this manner, radiographic image generation processing of generating an X-ray image (radiographic image) is carried out (period T705, step S1306 of FIG. 13). Although a lapse of a predetermined time serves as a condition for terminating the electric charge accumulating state in the first exemplary embodiment, an exemplary embodiment is not limited to such a configuration. For example, detection of the end of the X-ray irradiation may serve as a condition for terminating the electric charge accumulating state. In addition, although the predetermined time may be a fixed amount of time, it is preferable that the predetermined time can be varied in accordance with an irradiation condition or the like.

Figure 11:
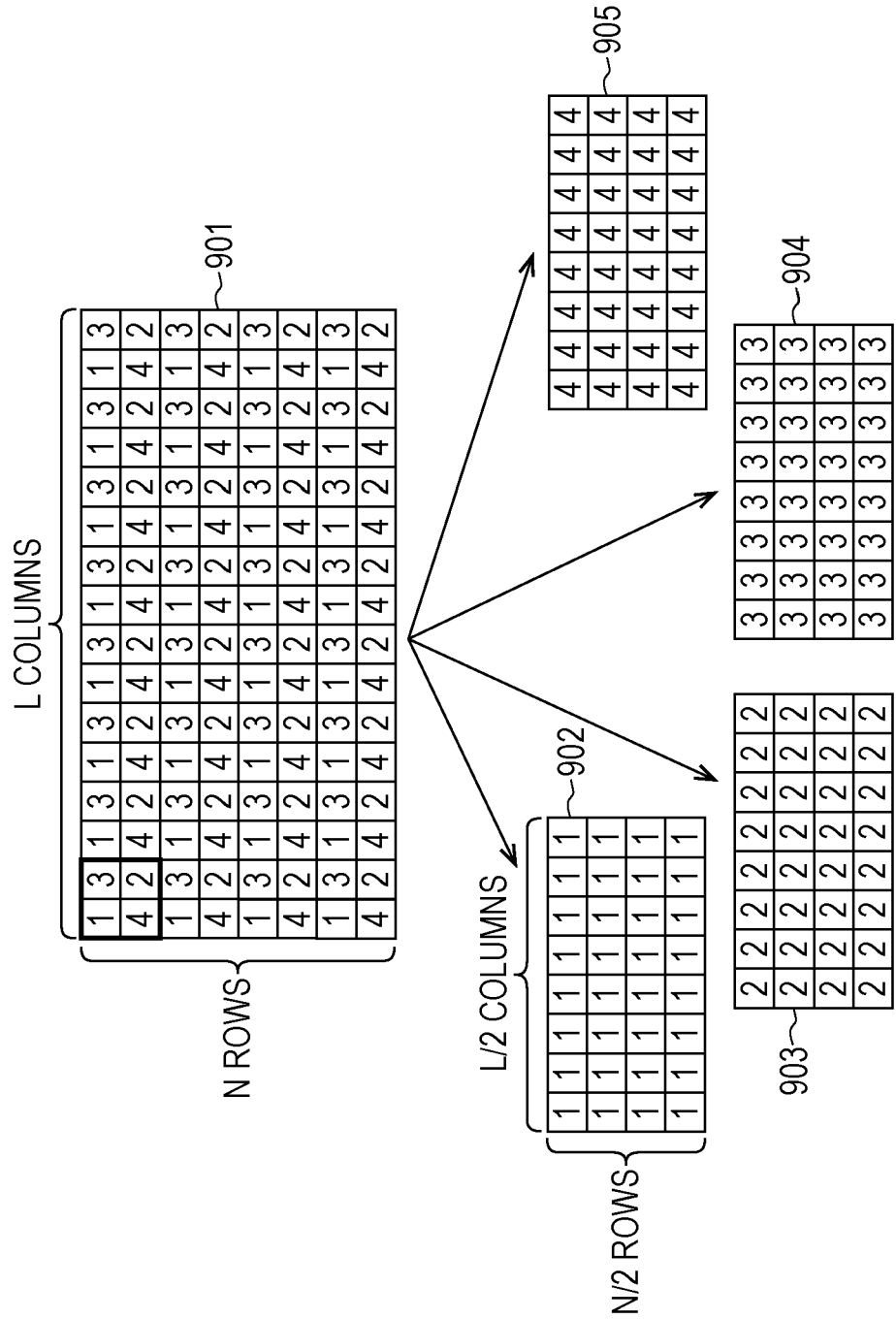
FIG. 11 is an illustration for describing a first exemplary method for transmitting pixels to the image processing apparatus.
Figure 12:
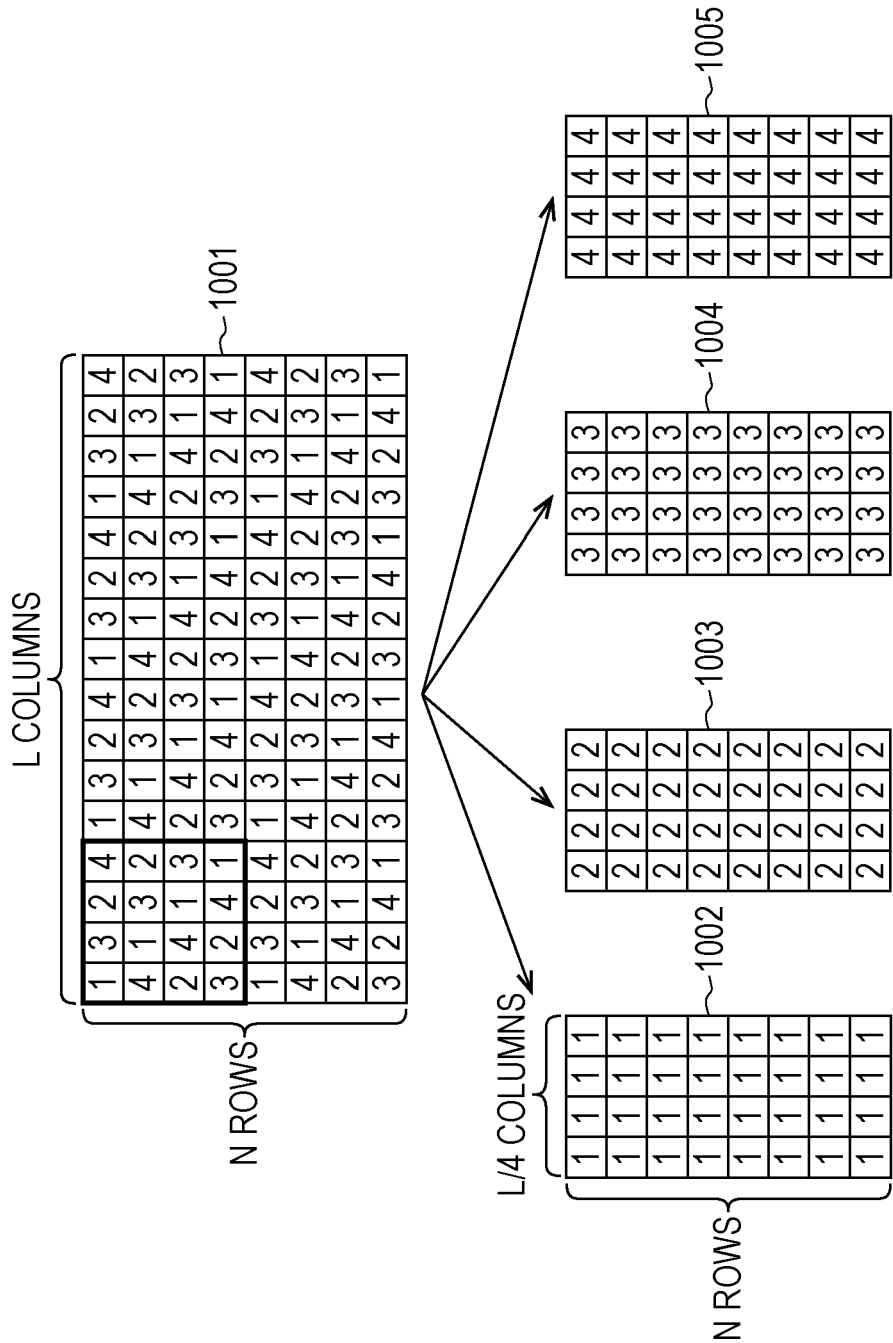
FIG. 12 is an illustration for describing a second exemplary method for transmitting pixels to the image processing apparatus.

After the X-ray image is generated, the X-ray imaging apparatus 101 transmits the data on the X-ray image to the image processing apparatus 105. The X-ray imaging apparatus 101, prior to transmitting the X-ray image, divides the X-ray image into a predetermined number of image segments in accordance with a predetermined rule and transmits the divided image segments successively to the image processing apparatus 105. Through this configuration, the image processing apparatus 105 can carry out preview processing of generating and displaying a preview image on the basis of part of the X-ray image prior to receiving the data on the entire X-ray image. FIGS. 11 and 12 are illustrations for describing examples of a method for transmitting pixels to the image processing apparatus 105. Each of FIGS. 11 and 12 illustrates an example in which the image is divided on the basis of the pixel position and the single X-ray image is transmitted successively as four image segments.

In the example illustrated in FIG. 11, the X-ray imaging apparatus 101 divides an X-ray image 901 into segments in units of 2×2 pixels (refer to a thick-bordered frame in the X-ray image 901). The X-ray imaging apparatus 101 then collects pixels that each have an identical pixel position relative to the rest of the pixels within the 2×2 pixel segment to thus divide the X-ray image 901 into four divided image segments 902 to 905.

In the example illustrated in FIG. 12, the X-ray imaging apparatus 101 divides an X-ray image 1001 into segments in units of 4×4 pixels (refer to a thick-bordered frame in the X-ray image 1001). The X-ray imaging apparatus 101 then collects pixels that are arranged on a diagonal line of the 4×4 pixel segment or pixels that are arranged on a line parallel to the diagonal line as a single block of pixels so as to extract four pixels that are each located on a different column and on a different row. The X-ray imaging apparatus 101 collects, from the extracted four pixels, pixels that each have an identical pixel position relative to the rest of the pixels within the 4×4 pixel segment to thus divide the X-ray image 1001 into four divided image segments 1002 to 1005. Here, the method for dividing the X-ray image 901 or 1001 is not limited to the method described above. In addition, the X-ray imaging apparatus 101 may first transmit, to the image processing apparatus 105, a preview image obtained by thinning an entire X-ray image in accordance with a predetermined rule and may then transmit the entire X-ray image at a later time. Alternatively, these methods may be combined.

The X-ray imaging apparatus 101 first transmits the divided image segment 902 or 1002 to the image processing apparatus 105 (period T706, step S1307 of FIG. 13). While receiving the divided image segment 902 or 1002, the image processing apparatus 105 carries out the correction processing and the image processing, as necessary, successively on the divide image segment 902 or 1002 by using the digital value 802, which has been transmitted from the X-ray imaging apparatus 101 and has already been subjected to the signal processing, and the scanning line number for identifying the scanning line on which the scan has stopped (period T707). The image processing includes, for example, an offset correction, a defective pixel correction, a tone correction, and a gain correction.

In the first exemplary embodiment, the offset component caused by an electric charge resulting from a dark current is corrected through a dark current image that has been obtained prior to the X-ray image being captured.

When the image processing is completed in this manner, the image processing apparatus 105 displays a primary preview image in the display device 302 such as a display (period T708). The X-ray imaging apparatus 101 then transmits the subsequent divided image segment 903 or 1003 to the image processing apparatus 105 (period T709). While receiving the divided image segment 903 or 1003, the image processing apparatus 105 combines the subsequent divided image segment 903 or 1003 with the divided image segment 902 or 1002, which has already been received, and carries out the correction processing and the image processing in a similar manner to the above (period T710). Upon completing the correction processing and the image processing, the image processing apparatus 105 displays a (higher-definition) secondary preview image, which has resolution higher than that of the primary preview image (period T711). Thereafter, the X-ray imaging apparatus 101 transmits the remaining divided image segment 904 or 1004 and divide image segment 905 or 1005 to the image processing apparatus 105 (periods T712 and T713). While receiving the divided image segment 904 or 1004 and the divided image segment 905 or 1005, the image processing apparatus 105 combines the divided image segment 904 or 1004 and the divide image segment 905 or 1005 with the divided image segments 902 and 903 or 1002 and 1003, which have already been received, and carries out the correction processing and the image processing in a similar manner to the above (period T714). Upon completing the correction processing and the image processing, the image processing apparatus 105 displays a final X-ray image (period T715, step S1308 of FIG. 13).

In a case in which the condition of the communication between the X-ray imaging apparatus 101 and the image processing apparatus 105 is poor, there is a possibility that the defect correction information (the digital value 801 and the scanning line number) and the X-ray image (divided image segments) cannot be transmitted or cannot completely be transmitted. Therefore, in a case in which at least one of the defect correction information and the X-ray image cannot be received within a predetermined period of time (within a time-out period), the image processing apparatus 105 may carry out an operation for notifying a user that a time-out has occurred and prompting the user to choose to carry out the transmission processing again at a later time after changing the environment or the like. For example, the image processing apparatus 105 may display as such on a graphical user interface (GUI) of the display device 302. Alternatively, the image processing apparatus 105 may notify through sounds by using a sounder or the like. Such an operation may instead be carried out in the X-ray imaging apparatus 101.

As compared with the X-ray image, the data amount of the digital value 801 and the scanning line number is small. Therefore, a communication protocol having low transmission efficiency but high reliability as compared to a communication protocol to be used in the communication for the X-ray image may be used as a communication protocol in the communication for the digital value 801 and the scanning line number. For example, in a case in which the X-ray imaging apparatus 101 and the image processing apparatus 105 are interconnected through a wireless LAN or the like, a user datagram protocol (UDP) may be used for transmitting the X-ray image while giving a priority to the speed. Meanwhile, a transmission control protocol (TCP), of which transmissivity is ensured, may be used for transmitting the digital value 801 and the scanning line number.

As described above, in the first exemplary embodiment, upon detecting irradiation of X-rays, the X-ray imaging apparatus 101 stops driving the scanning lines and makes a transition into the electric charge accumulating state. The X-ray imaging apparatus 101 transmits, to the image processing apparatus 105, a digital value of a current that flows through the bias line 206 and a scanning line number for identifying a scanning line on which the scan has stopped as the defect correction information at a timing at which the electric charge accumulating state starts. After transmitting the defect correction information, the X-ray imaging apparatus 101 transmits an X-ray image (i.e., divided image segments) to the image processing apparatus 105. Thus, the image processing apparatus 105 can process, prior to starting the correction processing on the X-ray image (i.e., divided image segments), the digital value of the current that flows inside the X-ray imaging apparatus 101 and that changes in value in response to the irradiation of the X-rays. In addition, such a configuration allows the image processing apparatus 105 to successively carry out correction processing on the X-ray image (i.e., divided image segments) by using the value of the stated current, while receiving the X-ray image (i.e., divided image segments). Thus, the above-described configuration allows the image processing apparatus 105 to carry out appropriate correction processing on the X-ray image (i.e., divided image segments) and display the X-ray image (i.e., divided image segments) without delay.

In the first exemplary embodiment, an example in which the transmission of the X-ray image (i.e., divide image segments) to the image processing apparatus 105 is started after the transmission of the defect correction information is completed has been described. However, as long as the transmission of the X-ray image (i.e., divided image segments) to the image processing apparatus 105 is started after the transmission of the defect correction information has been started, the above-described effect can be obtained, and thus the above-described configuration is not necessarily a requisite. For example, in the first exemplary embodiment, an example in which the transmission of the defect correction information is started after the X-ray image (radiographic image) is generated has been described. Alternatively, the X-ray image (radiographic image) may be generated after the transmission of the defect correction information is started (i.e., the order of steps S1305 and S1306 of FIG. 13 may be reversed).

Furthermore, in the first exemplary embodiment, an example in which the X-ray imaging apparatus 101 and the image processing apparatus 105 communicate with each other wirelessly has been described. Alternatively, the X-ray imaging apparatus 101 and the image processing apparatus 105 may communicate with each other through wired communication using a general purpose cable. Although each of the X-ray imaging apparatus 101 and the image processing apparatus 105 includes a built-in wireless transmitter-receiver in the above description, a wireless access point may be provided separately, and the X-ray imaging apparatus 101 and the image processing apparatus 105 may instead communicate through the access point.

In addition, in the first exemplary embodiment, an example in which the X-ray imaging apparatus 101 makes a transition into the electric charge accumulating state (period T702) in response to detecting the irradiation of the X-rays has been described. An exemplary embodiment, however, is not limited to such a configuration.

Figure 14:
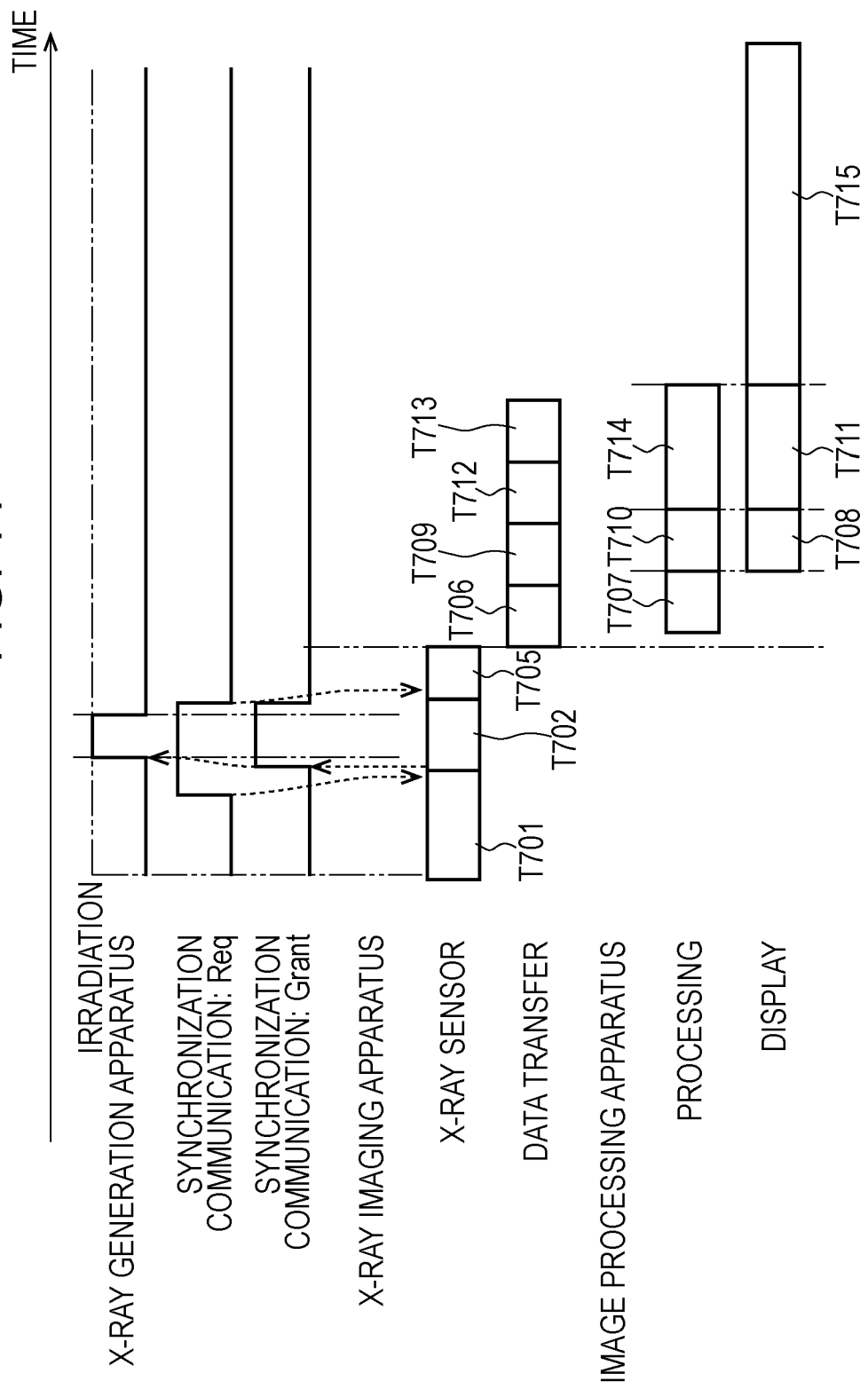
FIG. 14 is a timing chart illustrating a second exemplary operation of the X-ray imaging system.

FIG. 14 is a timing chart illustrating a modification of the operations of the X-ray generation apparatus 103, the X-ray imaging apparatus 101, and the image processing apparatus 105 carried out when an X-ray image is captured.

In FIG. 14, the X-ray generation apparatus 103 transmits a synchronization communication signal Req to the X-ray imaging apparatus 101. Upon receiving the synchronization communication signal Req, the X-ray imaging apparatus 101 makes a transition into the electric charge accumulating state (period T702) and also transmits a synchronization communication signal Grant to the X-ray generation apparatus 103. Upon receiving the synchronization communication signal Grant, the X-ray generation apparatus 103 starts radiating the X-rays. Even with such a configuration, as in the configuration illustrated in FIG. 9, the X-ray imaging apparatus 101 can generate the defect correction information at a timing at which the electric charge accumulating state starts and can transmit the defect correction information to the image processing apparatus 105, and the image processing apparatus 105 can carry out the signal processing on the defect correction information.

Second Exemplary Embodiment

A second exemplary embodiment will now be described. In the second exemplary embodiment, unlike the first exemplary embodiment, after an X-ray image is captured, an operation for capturing an image is carried out again in a state in which there is no irradiation of X-rays to thus obtain a dark current image. Then, an offset correction is carried out by using the X-ray image and the dark current image. In this manner, the second exemplary embodiment differs from the first exemplary embodiment primarily in that the processing for obtaining the dark current image is added. Thus, in the description of the second exemplary embodiment, configurations that are identical to those of the first exemplary embodiment are given reference characters identical to those indicated in FIGS. 1 to 10, and detailed descriptions thereof will be omitted.

Figure 15:
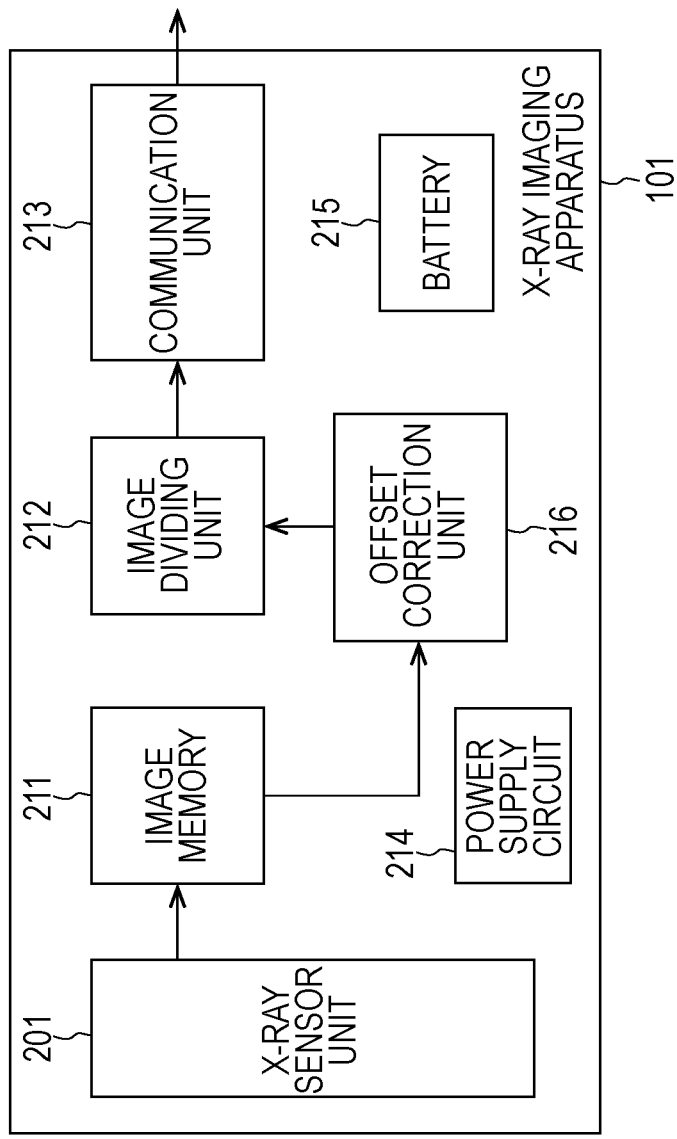
FIG. 15 illustrates a second exemplary configuration of the X-ray imaging apparatus.

FIG. 15 illustrates an exemplary configuration of an X-ray imaging apparatus 101. The X-ray imaging apparatus 101 of the second exemplary embodiment includes, in addition to the components included in the X-ray imaging apparatus 101 illustrated in FIG. 2, an offset correction unit 216.

Figure 16:
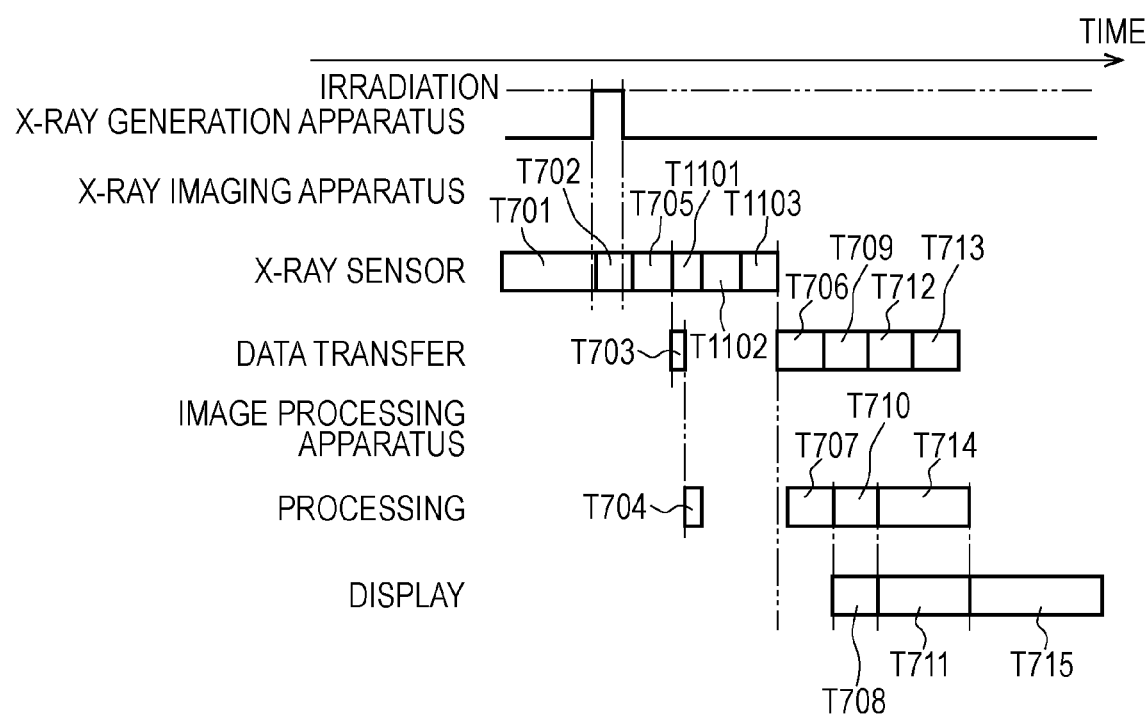
FIG. 16 is a timing chart illustrating a third exemplary operation of the X-ray imaging system.

FIG. 16 is a timing chart illustrating exemplary operations of the X-ray generation apparatus 103, the X-ray imaging apparatus 101, and the image processing apparatus 105 carried out when an X-ray image is captured.

As in the operations illustrated in FIG. 9 described in the first exemplary embodiment, the X-ray imaging apparatus 101 waits for the irradiation of the X-rays (period T701), accumulates an electric charge in response to detecting the irradiation of the X-rays (period T702), and generates an X-ray image by reading out the electric charge (period T705) in a similar manner in the second exemplary embodiment. After generating the X-ray image, the X-ray imaging apparatus 101 again drives the scanning lines (TFTs 204), which has been carried out in period T701 (period T1101).

Figure 17A:
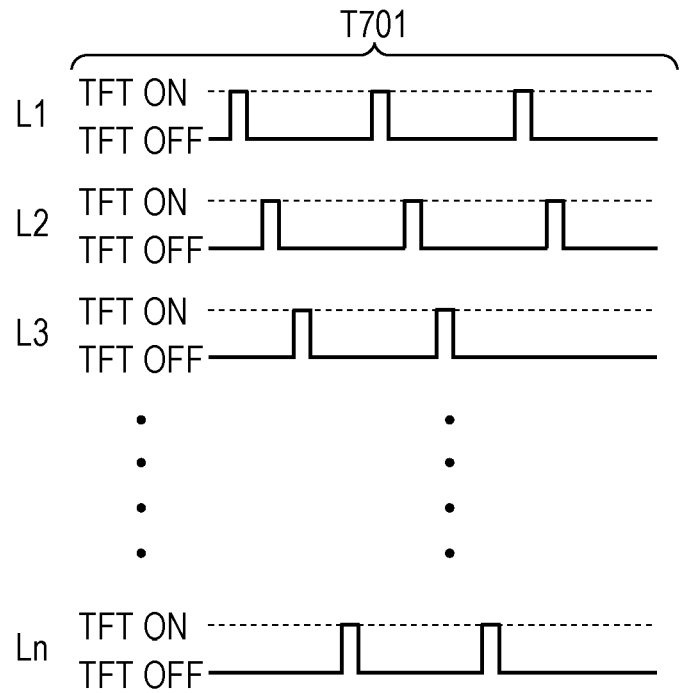
FIGS. 17A and 17B illustrate scanning sequences of the X-ray sensor unit at the time of X-ray irradiation and at the time of generating a dark current image.
Figure 17B:
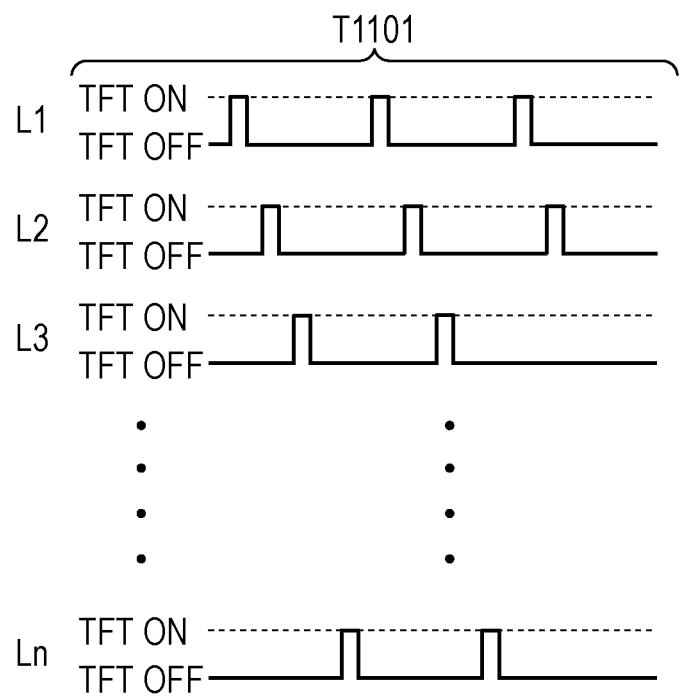

FIGS. 17A and 17B illustrate examples of content of the scans that are carried out in period T701 and in period T1101, respectively.

Referring to FIG. 17A, in a case in which the scan has been stopped on an L2 row in the period T701, in the period T1101, the scan is also stopped on the L2 row to simulate the scan carried out in the period T701 on the basis of the scanning line number stored in the register of the control unit 202. Here, unlike the period T701, it is not necessary to detect the irradiation of the X-rays in the period T1101, and thus the detection unit 205 is not put in operation.

Referring to FIG. 17B, while driving the scanning lines (i.e., simulating the scan) in the period T1101, the X-ray imaging apparatus 101 transmits the digital value and the scanning line number to the image processing apparatus 105 as the defect correction information (period T703). As in the first exemplary embodiment, the defect correction information may be transmitted while the X-ray imaging apparatus 101 is in the electric charge accumulating state as a result of detecting the irradiation of the X-rays (period T702) or may be transmitted during a dark current electric charge accumulating state (period T1102). Upon receiving the defect correction information, the image processing apparatus 105 carries out the processing in a similar manner to that in the first exemplary embodiment (period T704). The duration of the dark current electric charge accumulating state (period T1102) is set to have the same length of time as the duration of the electric charge accumulating state resulting from the irradiation of the X-rays being detected (period T702).

In a period T1103, the X-ray imaging apparatus 101 carries out dark current image generation processing by reading out the dark current electric charge and generating a dark current image. Then, the offset correction unit 216 subtracts the dark current image from the previously obtained X-ray image to carry out the offset correction. Thereafter, the X-ray imaging apparatus 101 transmits the X-ray image that has been subjected to the offset correction to the image processing apparatus 105 to have the X-ray image be processed and displayed. The procedure and the processing content thereof are similar to those of the first exemplary embodiment.

In the second exemplary embodiment, in order to minimize a possibility of noise being produced in the generated image due to the X-ray imaging apparatus 101 communicating while reading out an electric charge (period T705 or period T1103), the data is transmitted outside the period in which the electric charge is read out. However, if, for example, the influence of the noise is sufficiently small or if the preview is desired to be displayed more quickly, the aforementioned configuration may not necessarily need to be employed.

Through the configuration described thus far, in addition to the advantageous effect described in the first exemplary embodiment, such an advantageous effect that the offset correction can be carried out appropriately on the X-ray image can be obtained.

In the second exemplary embodiment as well, various modifications described in the first exemplary embodiment can be made.

The exemplary embodiments described above merely illustrate examples for embodying the present invention and do not in any way limit the technical scope of the present invention. In other words, the present invention can be implemented in various forms without departing from the technical spirit or the principal features of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present invention described above, a delay in displaying a radiographic image can be suppressed while a defect produced in the radiographic image representing an intensity distribution of radiation such as X-rays transmitted through an object is corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-044595, filed Mar. 6, 2013, which is hereby incorporated by reference herein in its entirety.

What is claimed is:
1. A radiographic apparatus, comprising:
a two-dimensional sensor in which a plurality of pixels is arranged in a two-dimensional matrix and each pixel has a TFT and a conversion element;
a detection unit configured to detect that the radiographic apparatus has been irradiated with radiation on the basis of a current that flows inside the radiographic apparatus and that changes in value in response to the radiographic apparatus being irradiated with the radiation;
a scanning unit configured to select one row or a plurality of rows of the plurality of pixels, to provide a signal to a scanning line connected to the selected plurality of pixels so as to turn on the TFTs of the selected plurality of pixels for a predetermined period of time to carry out a scan, and to stop the scan in response to the detection unit detecting that the radiographic apparatus has been irradiated with the radiation;

a radiographic image generation unit configured to turn off all of the TFTs of the plurality of pixels in response to the detection unit detecting that the radiographic apparatus has been irradiated with the radiation so as to accumulate an electric charge in the plurality of pixels, and then to turn on the TFTs of the selected plurality of pixels so as to read out the electric charge to generate a radiographic image; and a transmission unit configured to transmit defect correction information to be used to correct a defect in the radiographic image and the radiographic image, the defect correction information being obtained on the basis of a position at which the scan has stopped and a change in the current obtained when the detection unit has detected that the radiographic apparatus has been irradiated with the radiation, wherein the transmission unit starts transmission of the defect correction information prior to starting transmission of the radiographic image.

2. The radiographic apparatus according to claim 1, wherein the transmission unit starts the transmission of the radiographic image after completing the transmission of the defect correction information.

3. The radiographic apparatus according to claim 1, wherein the defect correction information includes information that is based on the current that changes in value in response to an electric charge flowing out, the electric charge being generated in the two-dimensional sensors in response to being irradiated with the radiation, and scanning line positional information that indicates the position of the scanning line arranged on a row being selected when the scan has stopped.

4. The radiographic apparatus according to claim 1, wherein the transmission unit transmits the defect correction information during a period in which the electric charge is being accumulated.

5. The radiographic apparatus according to claim 1, further comprising:

a dark current image generation unit configured to carry out, after the radiographic image generation unit has generated the radiographic image, a scan simulating the scan in a state in which the irradiation of the radiation is not present so as to generate a dark current image that is based on a dark current; and an offset correction unit configured to carry out an offset correction on the radiographic image generated by the radiographic image generation unit, on the basis of the dark current image generated by the dark current image generation unit, wherein the transmission unit transmits the radiographic image that has been subjected to the offset correction by the offset correction unit and transmits the defect correction information during a period in which the scan is being simulated.

6. The radiographic apparatus according to claim 1, further comprising:

a preview processing unit configured to generate a preview image of the radiographic image and to display the preview image on a display device, wherein the transmission unit divides the radiographic image into a plurality of divided image segments in accordance with positions of pixels in the radiographic image and successively transmits the plurality of divided image segments, and wherein the preview processing unit generates the preview image on the basis of part of the plurality of divided image segments and displays the preview image on the display device.

7. The radiographic apparatus according to claim 6, wherein the preview processing unit generates the preview image that differs in resolution depending on the number of the received divided image segments and displays the preview image on the display device.

8. The radiographic apparatus according to claim 1, wherein the transmission unit transmits the defect correction information by using a communication protocol that has lower transmission efficiency but has higher reliability than a communication protocol used to transmit the radiographic image.

9. A radiographic system, comprising:

the radiographic apparatus according to claim 1; and an image processing apparatus including an image correction unit configured to correct the defect produced in the radiographic image transmitted from the transmission unit by using the defect correction information transmitted from the transmission unit.

10. The radiographic system according to claim 9, wherein the image processing apparatus includes a processing unit configured to carry out processing on the defect correction information transmitted from the transmission unit, prior to receiving the radiographic image.

11. The radiographic system according to claim 9, wherein the image processing apparatus includes a notification unit configured to notify that the image processing apparatus has not received one of the radiographic image and the defect correction information within a predetermined period of time in a case in which the image processing apparatus does not receive one of the radiographic image and the defect correction information within the predetermined period of time.

12. A radiographic apparatus, comprising:

a radiation image sensor in which a plurality of pixels is arranged in a two dimensional matrix and each pixel has a TFT and a conversion element;

a detection circuit configured to detect that the radiation image sensor has been irradiated with radiation by monitoring a current that flows through the radiation image sensor and that changes in value in response to the radiographic apparatus being irradiated with the radiation;

a control unit configured to control the radiation image sensor to capture an image of the radiation in response to the detection circuit detecting that the radiation image sensor has been irradiated with radiation, wherein the control unit is configured to select one row or a plurality of rows of the plurality of pixels, to provide a signal to a scanning line connected to the selected plurality of pixels so as to turn on the TFTs of the selected plurality of pixels of the radiation image sensor for a predetermined period of time to carry out a scan, and to stop the scan in response to the detection circuit detecting that the radiographic apparatus has been irradiated with radiation; and a communication circuit configured to transmit, to an external apparatus capable of wirelessly communicating with the radiographic apparatus, information on a current to be used to correct a radiographic image obtained by capturing the image of the radiation, wherein the information on the current to be used to correct the radiographic image is obtained at each of timings prior to and following the irradiation of the radiation being detected, on the basis of a position at which the scan has stopped and a change in the current obtained when the detection circuit has detected that the radiographic apparatus has been irradiated with the radiation, and wherein the communication circuit, after transmitting the information on the current to be used to correct the radiographic image, transmits, to the external apparatus, the radiographic image.

13. A method for controlling a radiographic apparatus that includes a two-dimensional sensor in which a plurality of pixels is arranged in a two-dimensional matrix and each pixel has a TFT and a conversion element, the method comprising:

detecting that the radiographic apparatus has been irradiated with radiation on the basis of a current that flows inside the radiographic apparatus and that changes in value in response to the radiographic apparatus being irradiated with the radiation;

selecting one row or a plurality of rows of the plurality of pixels, providing a signal to a scanning line connected to the selected plurality of pixels so as to turn on the TFTs of the selected plurality of pixels for a predetermined period of time to carry out a scan, and stopping the scan in response to the radiographic apparatus having been irradiated with the radiation being detected in the detecting;

turning off all of the TFTs of the plurality of pixels in response to the radiographic apparatus having been irradiated with the radiation being detected in the detecting so as to accumulate an electric charge in the TFTs of the selected plurality of pixels, and then turning on the two-dimensional sensors so as to read out the electric charge to generate a radiographic image; and transmitting defect correction information to be used to correct a defect in the radiographic image and the radiographic image, the defect correction information being obtained on the basis of a position at which the scan has stopped and a change in the current obtained when it is detected in the detecting that the radiographic apparatus has been irradiated with the radiation, wherein transmission of the defect correction information is started prior to transmission of the radiographic image being started in the transmitting.

14. A non-transitory computer-readable storage medium storing a computer program including instructions to be executed by a computer to perform a method for controlling a radiographic apparatus that includes a two-dimensional sensor in which a plurality of pixels is arranged in a two-dimensional matrix and each pixel has a TFT and a conversion element, method comprising:

detecting that the radiographic apparatus has been irradiated with radiation on the basis of a current that flows inside the radiographic apparatus and that changes in value in response to the radiographic apparatus being irradiated with the radiation;

selecting one row or a plurality of rows of the plurality of pixels, providing a signal to a scanning line connected to the selected plurality of pixels so as to turn on the TFTs of the selected plurality of pixels for a predetermined period of time to carry out a scan, and stopping the scan in response to the radiographic apparatus having been irradiated with the radiation being detected in the detecting;

turning off all of the TFTs of the plurality of pixels in response to the radiographic apparatus having been irradiated with the radiation being detected in the detecting so as to accumulate an electric charge in the two-dimensional sensors, and then turning on the TFTs of the selected plurality of pixels so as to read out the electric charge to generate a radiographic image; and transmitting defect correction information to be used to correct a defect in the radiographic image and the radiographic image, the defect correction information being obtained on the basis of a position at which the scan has stopped and a change in the current obtained when it is detected in the detecting that the radiographic apparatus has been irradiated with the radiation, wherein transmission of the defect correction information is started prior to transmission of the radiographic image being started in the transmitting.

15. A radiographic apparatus, comprising:

a two-dimensional sensor in which a plurality of pixels is arranged in a two-dimensional matrix and each pixel has a TFT and a conversion element;

a detection unit configured to detect that the radiographic apparatus has been irradiated with radiation on the basis of a current that flows inside the radiographic apparatus and that changes in value in response to the radiographic apparatus being irradiated with the radiation;

a scanning unit configured to select one row or a plurality of rows of the plurality of pixels, to provide a signal to a scanning line connected to the selected plurality of pixels so as to turn on the TFTs of the selected plurality of pixels for a predetermined period of time to carry out a scan, and to stop the scan in response to the detection unit detecting that the radiographic apparatus has been irradiated with the radiation;

a radiographic image generation unit configured to turn off all of the TFTs of the plurality of pixels in response to the detection unit detecting that the radiographic apparatus has been irradiated with the radiation so as to accumulate an electric charge in the plurality of pixels, and then to turn on the TFTs of the selected plurality of pixels so as to read out the electric charge to generate a radiographic image; and a transmission unit configured to transmit information on the basis of a position of a scanning line at which the scan has stopped and the radiographic image, wherein the transmission unit starts transmission of the information on the basis of a position of a scanning line at which the scan has stopped prior to starting transmission of the radiographic image.

16. The radiographic apparatus according to claim 15, wherein the information on the basis of a position of a scanning line at which the scan has stopped is a scanning line number.

17. The radiographic apparatus according to claim 15, further comprising a dark current image generating unit configured to generate a dark current image which is an image based on a dark current, wherein the transmission unit transmits the information on the basis of a position of a scanning line at which the scan has stopped before the dark current image generating unit generates the dark current image.

18. The radiographic apparatus according to claim 17, wherein the transmission unit transmits the information on the basis of a position of a scanning line at which the scan has stopped during a period in which electric charge for obtaining the dark current image is being accumulated.

19. The radiographic apparatus according to claim 15, wherein the transmission unit transmits the information on the basis of a position of a scanning line at which the scan has stopped during a period which is different from a period in which electric charge for generating the radiographic image is being accumulated.

20. A radiographic system comprising:
the radiographic apparatus according to claim 15, and an image processing apparatus including an image correction unit configured to correct a defect produced in the radiographic image transmitted from the transmission unit using the information on the basis of a position of a scanning line at which the scan has stopped.

* * * * *